(12) United States Patent
Lohmar et al.

(10) Patent No.: US 10,440,084 B2
(45) Date of Patent: Oct. 8, 2019

(54) TECHNIQUE FOR DETECTING AN ENCODER FUNCTIONALITY ISSUE

(71) Applicant: Telefonaktiebolaget L M Ericsson (publ), Stockholm (SE)

(72) Inventors: Thorsten Lohmar, Aachen (DE); Ibtissam El Khayat, Glons (BE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 502 days.

(21) Appl. No.: 14/765,770

(22) PCT Filed: Sep. 30, 2013

(86) PCT No.: PCT/EP2013/070347
§ 371 (c)(1),
(2) Date: Aug. 4, 2015

(87) PCT Pub. No.: WO2014/121857
PCT Pub. Date: Aug. 14, 2014

(65) Prior Publication Data
US 2015/0373074 A1 Dec. 24, 2015

Related U.S. Application Data

(60) Provisional application No. 61/761,429, filed on Feb. 6, 2013.

(51) Int. Cl.
*H04L 29/06* (2006.01)
(52) U.S. Cl.
CPC ........ *H04L 65/607* (2013.01); *H04L 65/4076* (2013.01); *H04L 65/4084* (2013.01);
(Continued)
(58) Field of Classification Search
None
See application file for complete search history.

(56) References Cited

U.S. PATENT DOCUMENTS

| 2004/0186877 | A1  | 9/2004 | Wang et al. |
| 2010/0226428 | A1* | 9/2010 | Thevathasan ........... H04L 29/06 375/240.02 |

(Continued)

OTHER PUBLICATIONS

International Standard, "Information technology—Dynamic adaptive streaming over HTPP (DASH)—Part 1: Media presentation description and segment formats" ISO/IEC 23009-1, Apr. 1, 2012, 134 pages.

(Continued)

*Primary Examiner* — Natisha D Cox
(74) *Attorney, Agent, or Firm* — Rothwell, Figg, Ernst & Manbeck, P.C.

(57) ABSTRACT

A technique for detecting an encoder functionality issue in a media distribution system is presented. In the media distribution system consecutive media segments generated by an encoder are transmitted to a media client, and media descriptions describe expected availability times of media segments for the media client. A method implementation of the technique comprises the step of monitoring an availability time of a media segment compared to an expected availability time of the media segment, wherein the expected availability time is described by, or derived from, a media description. The method further comprises determining whether a deviation of the monitored availability time of the media segment from the expected availability time of the media segment is present, and detecting the encoder functionality issue based on a result of the determination. The encoder functionality issue may comprise one or more of an encoder restart, an encoder malfunction and an encoder time drift.

32 Claims, 5 Drawing Sheets

(52) U.S. Cl.
CPC .......... *H04L 65/602* (2013.01); *H04L 65/608* (2013.01); *H04L 65/80* (2013.01)

(56) References Cited

U.S. PATENT DOCUMENTS

| | | | | |
|---|---|---|---|---|
| 2010/0226444 | A1* | 9/2010 | Thevathasan | H04N 21/2187 |
| | | | | 375/240.29 |
| 2010/0266050 | A1* | 10/2010 | Keidar | H04H 20/18 |
| | | | | 375/240.25 |
| 2012/0042090 | A1* | 2/2012 | Chen | H04L 65/604 |
| | | | | 709/231 |
| 2012/0203867 | A1* | 8/2012 | Furbeck | H04L 65/4084 |
| | | | | 709/219 |
| 2012/0207088 | A1* | 8/2012 | Liu | H04L 65/608 |
| | | | | 370/328 |
| 2012/0209952 | A1 | 8/2012 | Lotfallah et al. | |
| 2013/0282871 | A1* | 10/2013 | Jung | H04L 65/60 |
| | | | | 709/219 |
| 2014/0189052 | A1* | 7/2014 | Gholmieh | H04L 67/02 |
| | | | | 709/217 |
| 2014/0189066 | A1* | 7/2014 | Gholmieh | H04L 67/02 |
| | | | | 709/219 |
| 2014/0195651 | A1* | 7/2014 | Stockhammer | H04N 21/23439 |
| | | | | 709/219 |
| 2014/0222962 | A1* | 8/2014 | Mao | H04N 21/4305 |
| | | | | 709/219 |
| 2016/0308928 | A1* | 10/2016 | Gholmieh | H04L 67/02 |

OTHER PUBLICATIONS

3GPP "3rd Generation Partnership Project; Technical Specification Group Services and System Aspects; Multimedia Broadcast/Multicast Service (MBMS); Protocols and codecs (Release 11)" 3GPP TS 26.346 Dec. 2012. 168 pages.

3GPP, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10)" 3GPP TS 26.247, Jun. 2012, 110 pages.

International Standard ISO/IEC 13818, ITU-T Recommendation H.222.0, May 2006, 190 pages.

European Communication dated Dec. 4, 2017, issued in European Patent Application No. 13 773 215.2, 7 pages.

"Information technology—Dynamic adaptive streaming over HTTP (Dash)—Part 1: Media presentation description and segment formats" ISO/IEC JTC 1 SC 29; ISO/IEC DIS 23009-1; ISO/IEC 1/SC 29 WG 11, Aug. 30, 2011, 131 pasge.

International Search Report and Written Opinion issued in corresponding international application No. PCT/EP2013/070347, dated Jan. 16, 2014, 12 pages.

\* cited by examiner

TECHNIQUE FOR DETECTING AN ENCODER FUNCTIONALITY ISSUE

CROSS REFERENCE TO RELATED APPLICATION(S)

This application is a 35 U.S.C. § 371 National Phase Entry Application from PCT/EP2013/070347, filed Sep. 30, 2013, which claims priority to U.S. Application No. 61/761,429 filed Feb. 6, 2013. The above identified applications are incorporated by reference.

TECHNICAL FIELD

The present disclosure generally relates to media distribution. In particular, a technique for detecting an encoder functionality issue in a media distribution system is described. The technique can be implemented in the form of methods, network devices, systems and computer programs.

BACKGROUND

Dynamic Adaptive Streaming over HTTP (DASH) is a timeline driven technology requiring a very tight synchronization between a client and a server for dynamic or live content streaming. For example, DASH is defined in ISO 23009-1 and 3GPP TS 26.247 V11.1.0 (2012-12). DASH over evolved Multimedia Broadcast and Multicast Services (eMBMS) is defined, for example, in 3GPP TS 26.346 V11.3.0 (2012-12).

The client may receive a media description, for example a Media Presentation Description (MPD), and consecutive media segments. The MDP describes media segment-related information, including media segment timing information that permits synchronization between the server and its client or clients.

The client can be a terminal and the streaming can be a video. In a case the client is requesting a media segment that has not been generated yet by the server and there is no means to get the synchronization back, the client will keep requesting the media segment not being generated yet and will never play the video. In a different case the client may request old media segments, i.e., media segments which have already been sent by the server, then either the media segments are still available and the client will play with a certain delay or the media segments are already obsolete and removed from the server and no video will be played.

In a unicast scenario, when synchronization between the client and the server gets lost, the client may fetch a fresh MPD to re-establish synchronization. Fetching a fresh MPD is, however, not possible in a broadcast scenario.

Some Live Encoders (LE) frequently generate MPDs, for example up to one MPD is generated per every media segment duration. Whenever something goes wrong [deviation/malfunctioning] with the LE, i.e., in the case of an encoder functionality issue, a new MPD is generated. Also, when instead of the segment number the media play time is used as index, the Live Encoder/Segmenter may frequently update the MPD. In a unicast case where the MPD can be fetched frequently, any issue with the LE functionality will be overcome easily with a new download of the MPD file.

However, in a case of broadcast only one version of the MPD is sent towards the client. The system side may send an updated MPD, but it needs to detect that the update is necessary.

SUMMARY

There is a need for a technique that permits an efficient detection of an encoder functionality issue, in particular for the DASH over Broadcast case and similar cases in which the clients need to work for a long time with the same MPD.

According to one aspect, a method is provided for detecting an encoder functionality issue in a media distribution system in which consecutive media segments generated by the encoder are transmitted to a media client and in which media descriptions describe expected availability times of media segments for the media client. The method comprises monitoring an availability time of a media segment compared to an expected availability time of the media segment, wherein the expected availability time is described by or derived from a media description. The method further comprises determining whether a deviation of the monitored availability time of the media segment from the expected availability time of the media segment is present, and detecting the decoder functionality issue based on a result of the determination.

The encoder functionality issue may take various forms. For example, the encoder functionality issue may comprise one or more of an encoder restart, an encoder time drift, an encoder malfunction, a longer (than usual) segment duration, and an insertion or removal of a leap second.

The expected availability time may be described by or derived from an initial media description. In one variant, the initial media description is a media description distributed over a service discovery channel before the beginning of media segment transmission. In another variant, the initial media description is a media description sent before media segment generation. In both variants, the initial media description may be distributed via multicast or broadcast. In a still further variant, the initial media description is provided for being fetched via unicast before the beginning of media segment transmission.

The media segments may have respective indices. As an example, the media segments may be numbered in a consecutive manner or otherwise. In such an implementation, the deviation of the monitored availability time from the expected availability time may be determined on an index basis. As an example, the (e.g., detected) index of a current media segment may deviate from an expected (e.g., calculated) index. In one implementation, the method may comprise determining the expected availability time from a sum of an availability start time and a product of a segment index and a segment duration. In this implementation, the segment duration may (essentially) be constant.

There exist alternatives to determining the deviation on an index basis. As an example, the deviation may be determined on a time basis. In the latter case, the media segments may have respective media presentation times (e.g., carried in the media segments), and the deviation of the monitored availability time from the expected availability time may be determined on a media presentation time basis. The deviation may be determined by comparing a media presentation time in the latest available media segment with an expected (e.g., calculated) media presentation time. The expected media presentation time may be derived from the media description.

Therefore, in connection with the present disclosure, the availability time may, for example, be given or processed in the form of a media segment index (e.g., a media segment number) and/or a media segment presentation time. The term availability time as used herein may thus be understood in a broader manner (and may, e.g., also encompass what could be termed "availability index").

One possibility for detecting an encoder functionality issue in a media distribution system with consecutive media segments is to monitor the presentation timeline of the media segments against an expected presentation timeline. As said, each media segment may carry a presentation time during or at which the media carried by the segment is rendered. The media presentation time is monotonically increasing (wrap around supported). It is possible to derive an expected presentation time for each media segment from the media description.

The expected availability time may be derived in various manners. For example, the expected availability time may be derived by interpolating one or more of an availability start time, a segment index and a presentation time offset.

The monitored availability time may be represented in various forms. In one variant, the monitored availability time is represented by a media segment index value (e.g., a segment number). In another variant, monitored availability time is represented by the media presentation time of the latest available media segment (which may then be compared with an expected media presentation time).

The method presented herein may also comprise monitoring a media description storage for a media description updated by the encoder. In such a case the monitored availability time may be determined from the updated media description.

The method presented herein may also comprise monitoring a content storage that stores the media segments prior to transmission. In such a case the monitored availability time may be determined from a new media segment in the content storage. Alternatively, or in addition, the monitored availability time of the media segment may correspond to a reception time of the media segment in the monitored content storage.

The step of determining the deviation may be initiated in response to a specific triggering event. As an example, the triggering event may be reception of a new media segment or a new media description. Additionally, or alternatively, the triggering event may be expiry of a timer. The timer may be set in accordance with a media segment duration. As an example, a monitoring function wakes-up (e.g., with a fixed interval) according to the segment duration. After wake-up, the monitoring function checks whether the expected segment is already in the content storage.

Generally, the media segments may be transmitted via broadcast. As an example, eMBMS broadcast may be used in this regard.

The media description may be a media manifest. That media manifest may, in one variant, be compliant with Dynamic Adapted Streaming over HTTP (DASH).

The method presented herein may be performed by a monitoring entity located on a system-side to which the media client can connect. As an example, the monitoring entity may be co-located on the system-side with a Broadcast Multicast Service Center (BM-SC), another network entity in charge of updating the media description, or the media client.

In one realization, an update of a media description is initiated in response to the detected encoder functionality issue. As an example, an update of the initial media description may be initiated. The updated media description provides typically time adjusted descriptions of the media segments.

The initiation of the update may comprise sending a notification to a network entity responsible for updating the media description. As said, the media segments may have respective indices and/or presentation time information. In such a case the method presented herein may further comprise initiating a change of the segment indices and/or presentation time (e.g., of associated timestamps) of media segments generated by the encoder in response to the detected encoder functionality issue. As an example, the segment indices may be contained in media segment names assigned by the encoder. Thus, the segment indices may be changed by changing the media segment names assigned by the encoder. Alternatively, initiating a change of the segment indices may comprise triggering the encoder to change an assignment scheme for a media segment naming. In one more specific realization, the presentation time may be contained in a so-called sidx box as value of the earliest_presentation_time field. The presentation time may be changed by the encoder.

The method presented herein may further comprise determining the deviation between the monitored (e.g., detected) availability time and the expected (e.g., calculated) availability time (e.g., on a time basis or on the basis of media segment indices). In such a case, the determined deviation may be compared with at least one threshold, so that the encoder functionality issue may be detected based on a result of the comparison. As an example, the encoder functionality issue may be detected if the deviation is above or below the at least one threshold. The at least one threshold may be represented by a period of time or a number of segments. By determining whether the deviation may be above or below the at least one threshold, a drift ahead or a drift behind of the encoder may be detected.

According to another aspect, a method is presented for correcting an encoder functionality issue in a media distribution system in which consecutive media segments generated by the encoder are transmitted to a media client and in which media descriptions describe expected availability times of media segments for the media client. The method comprises correcting the encoder functionality issue in response to a deviation of a monitored availability time of a media segment from an expected availability time of the media segment, wherein the expected availability time is described by or derived from a media description.

Correcting the encoder functionality issue may comprise updating the media description. In one variant, the media description is updated in response to receipt of a notification of a monitoring entity that the deviation has been detected. In addition, or as an alternative, updating the media description may comprise adapting at least one of an availability start time and a segment number in the media description based on the deviation.

In response to a media description update (including receipt of an update request or notification), one or more steps may be performed. Such steps may comprise sending the updated media description in-band with a media data segment broadcast and/or sending the updated media description on a service discovery channel and/or storing the updated media description in a media description storage for fetching over unicast.

Also provided is a computer program, or computer program product, comprising program code portions for carrying out the steps of any of the methods and method aspects presented herein when run by a computing device. The computer program may be stored on a computer-readable medium, such as a CD-ROM, DVD or semiconductor memory. The computer program may also be provided for download via a communication network.

According to a still further aspect, a monitoring entity is provided for detecting an encoder functionality issue in a media distribution system in which consecutive media segments generated by the encoder are transmitted to a media client and in which media descriptions describe expected availability times of media segments for the media client.

The monitoring entity comprises a monitoring entity adapted to monitor an availability time of a media segment compared to an expected availability time of the media segment, wherein the expected availability time is described by or derived from a media description. The monitoring entity further comprises a determination unit adapted to determine whether a deviation of the monitored availability time of the media segment from the expected availability time of the media segment is present. The monitoring entity is further adapted to detect the decoder functionality issue based on a result of the determination.

The monitoring entity may also comprise an initiating unit adapted to initiate an update of a media description in response to the detected decoder functionality issue. It should be noted in this regard that detecting the encoder functionality issue can be implicit, in which case the initiating unit is adapted to initiate an update of the media description based on a result of the determination.

Also provided is a network entity for correcting an encoder functionality issue in a media distribution system in which consecutive media segments generated by the encoder are transmitted to a media client and in which media descriptions describe expected availability times of media segments for the media clients. The network entity comprises a unit adapted to correct the encoder functionality issue in response to a deviation of a monitored availability time of a media segment from an expected availability time of the media segment, wherein the expected availability time is described by or derived from a media description.

The unit adapted to correct the encoder functionality issue may be an updating unit adapted to update the media description. In other words, correcting the encoder functionality issue may comprise updating the media description.

Also provided is a system for correcting an encoder functionality issue (e.g., by updating the media description). The system comprises the monitoring entity presented herein as well as the network entity presented herein.

BRIEF DESCRIPTION OF THE DRAWINGS

The foregoing and other objects, features and advantages of the present disclosure will become more apparent in the following detailed description of embodiments as illustrated in the accompanying drawings.

DETAILED DESCRIPTION

In the following description of exemplary embodiments, for purposes of explanation and not limitation, specific details are set forth, such as particular methods, functions and procedures, in order to provide a thorough understanding of the technique presented herein. It will apparent to one skilled in the art that this technique may be practiced in other embodiments that depart from those specific details. For example, while the following embodiments will primarily be described on the basis of DASH in connection with eMBMS (e.g., in accordance with the standards defined above), it will be appreciated that the present disclosure could also be implemented in connection with other streaming or file distribution protocols and/or alternative multimedia distribution services.

Moreover, those skilled in the art will appreciate that the methods, functions and procedures explained herein may be implemented using software functioning in conjunction with a programmed microprocessor, an Application Specific Integrated Circuit (ASIC), a Digital Signal Processor (DSP) or general purpose computer. It will also be appreciated that while the following embodiments will primarily be described in the context of methods, systems and devices, the present disclosure may also be embodied in a computer program which can be loaded to run on a computing device or a distributed computer system comprising one or more processors and one or more memories functioning as a storage. The one or more memories may be configured to store one or more computer programs that control the one or more processors to perform the methods, functions and procedures disclosed herein.

Figure 1:
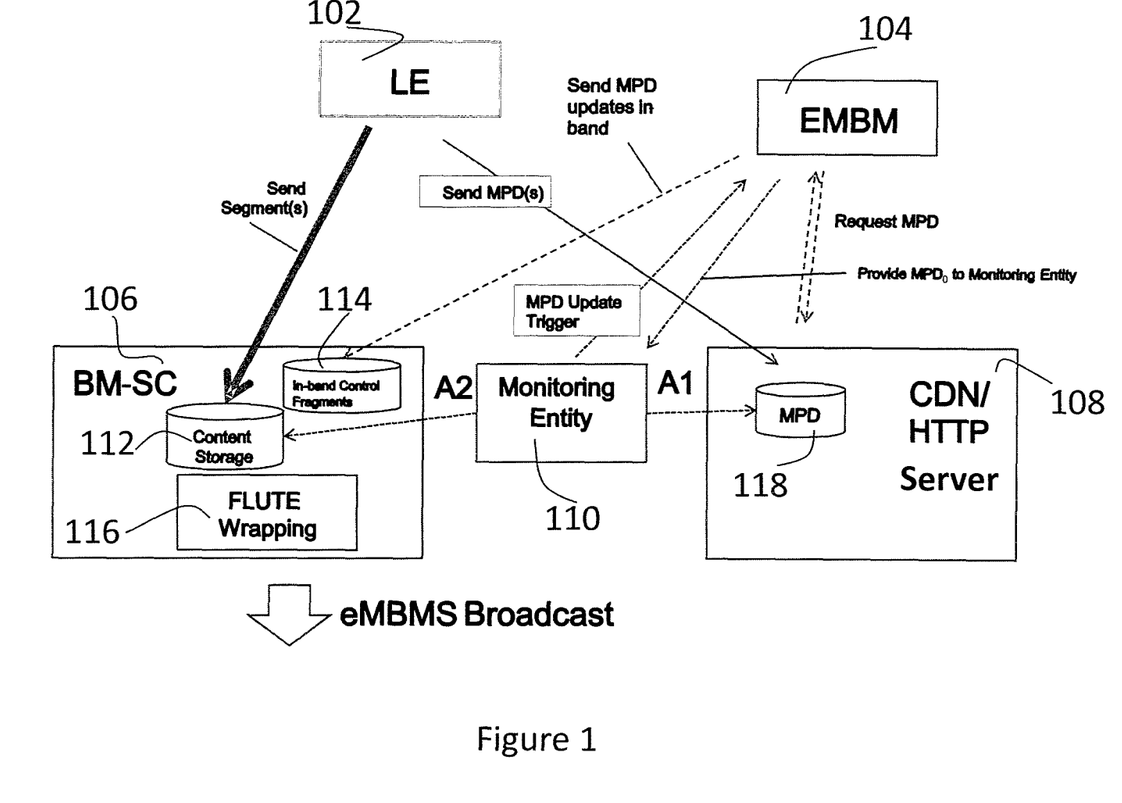
FIG. 1 is a block diagram illustrating a system for updating a media manifest, or media description, according to an embodiment.

FIG. 1 illustrates a media distribution system 100 according to an embodiment of the present disclosure. In one variant the media distribution system may take the form of a media streaming system.

As illustrated in FIG. 1, the media distribution system 100 comprises an encoder 102, which in the present embodiment is configured as a so-called Live Encoder (LE). In one exemplary realization, the encoder 102 may contain also a media segmenter function to create DASH media segments. The system comprises an MBMS provisioning system such as an evolved Multimedia Broadcast and Multicast Services sub-system (eMBMS) 104, a Broadcast Multicast Service Center (BM-SC) 106 and a Hypertext Transfer Protocol (HTTP) or Content Data Network (CDN) server 108. The media distribution system 100 further comprises multiple media clients (not shown) and a monitoring entity 110 functionally located between the eMBMS 104, the BM-SC 106, and the HTTP/CDN server 108.

The BM-SC 106 comprises a content storage 112 for storing media segments received from the LE 102, a storage 114 for in-band control fragments from the eMBMS 104 and a component 116 in charge of wrapping in accordance with the FLUTE protocol (see, e.g., RFC 3926). The CDN/HTTP server 108 comprises a media description storage 118, which in the present embodiment is configured to store media descriptions, or media manifests, in the exemplary form of MPDs.

The system 100 is generally configured to generate, by the LE 102, consecutive media segments that constitute a media stream. The media segments generated by the LE 102 are intended to be transmitted to the media clients within the system 100. In this regard, the media descriptions, or media manifests, describe expected availability times of media segments for media clients. As stated above, FLUTE or another protocol for the unidirectional delivery of files (via streaming or otherwise) may be used in this regard.

In the following, an automatic LE restart detection and/or a LE malfunctioning detection (i.e., detection of an LE functionality issue) in association with the eMBMS 104 according to an embodiment is described with reference to FIGS. 1 to 4.

The system 100 of FIG. 1 is adapted to detect, inter alia, a LE malfunctioning and/or a LE time drift. As said, the system 100 comprises the LE 102, which is adapted to generate consecutive media segments of a video and to send the generated media segments to the content storage 112 of the BM-SC 106, in which the media segments are storable. The LE 102 is also adapted to send an MPD to the HTTP server or Content Data Network (CDN) server. The HTTP server 108 can be a node of the CDN. The MPD is storable by the HTTP server or the CDN server 108, respectively, in storage 118. The eMBMS 104 is adapted to receive a MPD from the HTTP server or the CDN server 108, respectively.

The monitoring entity 110 of the system 100 is adapted to monitor the storage 118 of the MPD in the HTTP server or the CDN server 108, respectively. A respective monitoring process is labeled in FIG. 1 using "A1", and will be described with reference to FIG. 3. The monitoring entity 110 is also adapted to monitor the content storage 112, for example, a media segment, in the BM-SC 106. A respective monitoring process is labeled in FIG. 1 using "A2", and will be described with reference to FIG. 4. The monitoring entity 110 is also adapted to determine whether a malfunction or other functionality issue of the LE 102 is present, and to send a respective MPD update trigger to the eMBMS 104. The eMBMS 104 is adapted to initiate an update of the MPD based on the received MPD update trigger.

A client (not shown in FIG. 1), for example a terminal, is connectable to the system 100 and is adapted to receive the video segments from the BM-SC 106 and at least one MPD from the HTTP server or CDN server 108. As shown in FIG. 1, the video segments are received via eMBMS broadcast. The client is also adapted to play out the received video segments.

Figure 2:
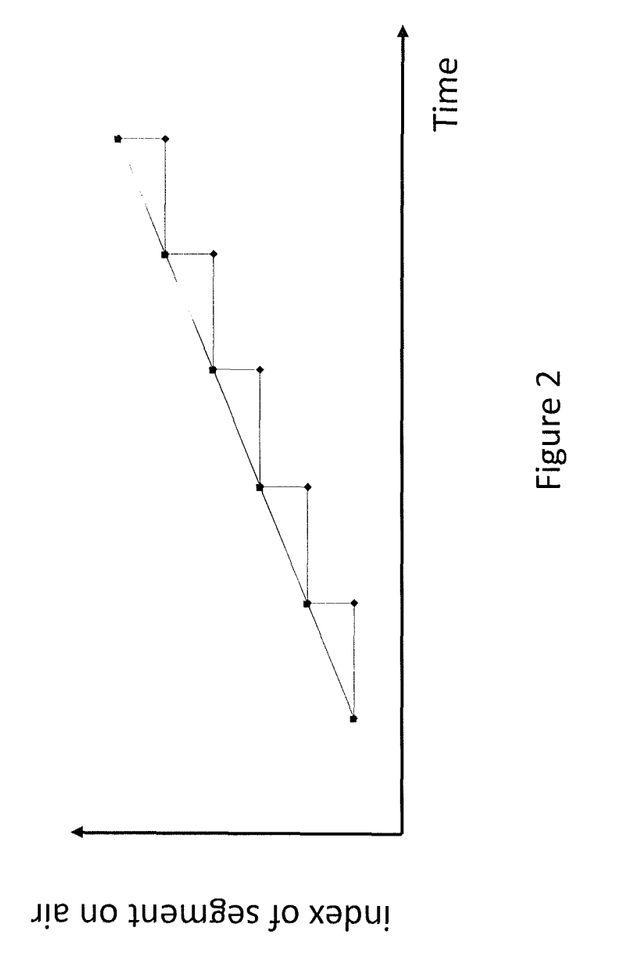
FIG. 2 is a diagram illustrating a time dependency of an index of a media segment which is expected to be on air.

Referring to FIG. 2, a malfunction and deviation of the LE 102 will be explained. The video segments will be referred to as segments.

The MPD sent to the client comprises information about the availability start time referred to as AVST, the start number of the segment referred to as startNumber and a duration of the segment. The LE 102 increments the segment index after each segment duration. As shown in FIG. 2, the indices represent a stair function with respect to a time. Using these parameters the client calculates the segment which is expected to be on air at an instant t, segment_on_air, using the formula $$\text{segment\_on\_air} = [t - \text{AVST}]/\text{duration} - \text{startNumber}.$$

For ease of explanation, the stair function will be referred to as a linear function. This assumption is true for the case of the edge points of a curve associated with the stair function.

The linearity of the function can be alternated in the following cases. In any of these cases the index of the segment on air is either behind or ahead of the estimated one. If the index is behind, then no video will be played. If the index is ahead, then the video will be played with a certain delay.

A deviation of the estimated index of the segment on air and the actual index can result from the following:
  The LE 102 is restarted. A new startNumber is generated. In such a case, the estimation of the index of the segment on air is incorrect and will be ahead or behind depending on the newly generated startNumber.
  A time drift is present in the LE 102.
  A longer segment duration.
  An insertion/removal of a leap second.

A method performed by the above described system 100 enables that it is detected that the LE 102 is out of track or that the LE 102 has restarted. Further, the eMBMS 104 or an operator of the system 100 can be automatically alerted in order to correct the malfunction or deviation of the LE 102.

In eMBMS, the LE 102 is typically injecting the content, i.e., segments, of a Live Feed into the content storage 112, for example a WebDAV folder. The associated MPD is also updated with a certain frequency and is uploaded into the MPD storage 118, for example a separated folder on the HTTP server or CDN server 108. In one embodiment, the MPD storage 118 is separated from the content storage 112. In one embodiment, an updated MPD will be stored in the MPD storage 118. In another embodiment, an updated MPD will not be stored in the MPD storage 118.

Further, only a first MPD, which is called MPD_0 in the following, is distributed over a separate Service Discovery Channel (SDCH channel) at the very beginning of the broadcast of the content or fetched using unicast. The MPD might have been slightly modified by the eMBMS 104 to compensate the eMBMS end to end delay.

In case a service setting may have changed, for example which is accomplished by the operator, or the LE 102 restarts, it is necessary to update the MPD. In that event, the eMBMS 104 sends an in-band MPD and also updates the MPD on the SDCH channel or the storage 118 of the MPD made available for MPD fetching over unicast.

For example, an automatic MPD update can be triggered in case of an LE restart or LE drift being larger than a threshold. More than one threshold can be used. The one or more thresholds can be predetermined or can be dynamically set during the broadcast.

The monitoring entity 110 is responsible for detecting LE deviation/restarts. The monitoring by the monitoring entity 110 is performed either on the MPD storage 118 by reading always the latest MPD from the LE 102 or on the content storage 112 the of media segments or on both. It is noted that an LE 102 is adapted to update MPDs, but only a very first MPD is modifiable and distributable over broadcast.

The monitoring entity 110 continuously verifies that a media segment according to the MPD_0 description is uploaded by the LE 102 into the WebDav Folder 112 at the MPD specified correct wall clock time. This is done by matching the URI of the uploaded segment and also checking the presentation time offset within the segment (in sidx and tfdt box of the segment) and checking it against the segment availability time. The segment availability time is the sum of the availability start time (AVST) plus the segment number times the segment duration. It is referred to the description of FIG. 2 for the respective formula.

If the monitoring entity 110 is comparing against the updated MPDs from the LE 102, the monitoring entity 110 checks whether it can reach the same MPD values by interpolating the Availability Start Time, the segment number and the presentation time offset.

If the monitoring entity 110 uses the event of a new segment reception or the event of a new MPD reception as trigger for the verification procedure (i.e., for determining a deviation), then the monitoring entity also sets a timer, after which at latest the next verification procedure is executed. If that timer expires, then the monitoring entity 110 has not received a new MPD or a new segment in the expected duration, thus the LE 102 will determine the deviation (i.e., LE 102 is deviating from the timeline).

In case the monitoring entity 110 detects an inconsistency between segments and MPD, the monitoring entity 110 will trigger the eMBMS 104 to send an in-band update of the MPD and also update the MPD in the SDCH.

In the following several examples of monitoring by the monitoring entity 110 will be described in more detail.

Figure 3:
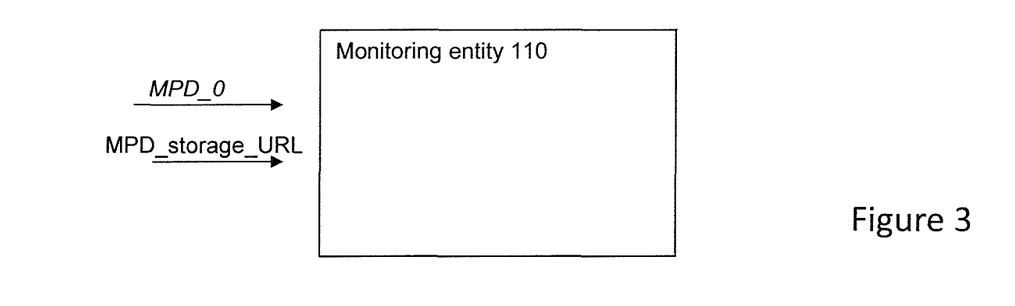
FIG. 3 is a block diagram illustrating an embodiment of the monitoring entity of the system in FIG. 1.

Referring to FIG. 3, monitoring of the MPD storage 118 will be described. Each MPD file comes with its own availability start time, its own startNumber and all of the MPD should have the same duration. Before the beginning of the broadcast, an MPD is picked up which is named for explanation purposes MPD_0. This MPD is sent to the client and is potentially modified by the eMBMS 104.

The monitoring entity 110 is provided as input with MPD_0 and a storage location of this MPD. The storage location alone could also be envisioned as input, and then the first file will be considered as MPD_0.

The following algorithm (pseudocode example) may be used by the monitoring entity 110, where avst(MPD_0) refers to the value of the availability start time attribute and startNumber(MPD_0) to the value of the startNumber attribute of the initialization MPD_0. startNumber(updated_mpd) is the value of the startNumber attribute and avst(updated_mpd) the value of the availability start time attribute of the updated MPD. Duration is the segment duration, which is also provided by the initialization MPD_0. An optional MPD_update_timer is started with the timeout equal to duration plus allowed_offset. The duration is the segment duration and the allowed_offset is an extra duration as safety margin:

Intitialisation
Avst=avst(MPD_0)
start
startNumber=startNumber(MDP_0)
start an optional MPD_update_timer with the expiration value duration+allowed_offset.
at every mpd update the monitoring entity performs the following:

currentIndex=(avst(updated_mpd)−Avst)/duration+startNumber currentIndex!=startNumber(updated_mpd) then LE deviation
restart the optional MPD_update_timer with the expiration value duration+allowed_offset.

The notation A!=B denotes A being different from B.

It is appreciated that the above algorithm can be also implemented by comparing a difference between the currentIndex and the startNumber(updated_mpd) with a threshold, in order to detect a drift ahead or a drift behind of the LE 102.

When the MPD_update_timer expires, then the monitoring entity 110 has not received an updated MPD in the expected timeframe. Timer expiry thus indicates an LE deviation.

Another embodiment for monitoring the MPD storage 118 can be summarized as follows:
MPD_0 is put into the MPD storage.
A new MPD n is put into the MPD storage. This happens on a regular basis at time instances tn.
A duration between the time instance t0 at which MPD_0 is put into the MPD storage and the time instance tx at which MPD n is put into the MPD storage is calculated using the respective presentation time offset PTO included in the MPD_0, MPD n (see below, difference between the two values).
This duration is again calculated using
(alt 1) the injection time instance t0 of MPD_0 and the injection time instance tx of MPD_n (see algorithm 1 below), or
(alt 2) the availability starttime in MPD_0 at the time instance t0 and the availability starttime of MPD_n at the injection time instance tn (see algorithm 2 below).

Both durations are compared, e.g., using thresholds such as threshold_drift_behind, threshold_drift_ahead.

One of the following two pseudocode examples may be used to implement the above procedure. The examples describe essentially the same behavior and mainly differ in their notation. While the first example is based on units of time, the second example is based on units of segments. PTO(MPD_0) refers to the value of the presentation time offset XML attribute from the initialization MPD_0

Example 1

Initialisation:
Avst=avst(MPD_0)
t0=injection time of MPD_0
PTO_0=PTO(MPD_0)
start an optional MPD_update_timer with the expiration value duration+allowed_offset
At every mpd update, the monitoring entity performs the following
Now=current_time( )//injection time of MPD_n
Expected_PTO_N=(now−t0)+PTO_0 (alt 1)
restart the optional MPD_update_timer with the expiration value duration+allowed_offset.
Expected_PTO_N=(avst(MPD_n)−avst 0)+PTO_0 (alt 2)
If [Expected_PTO_N−PTO(MPD_n)]> (threshold_drift_ahead*segment_duration)
OR
If [Expected_PTO_N−PTO(MPD_n)]< (threshold_drift_behind*segment_duration)
Then LE deviation.
Note: for example for alt 1, threshold_drift_behind, it is calculated with $\Delta t = t\_n - t0$ and $\Delta T = PTO\_n - PTO\_0$ $\Delta t - \Delta T <$ threshold_drift_behind $t\_n - t0 - (PTO\_n - PTO\_0) <$ threshold_drift_behind $t\_n - t0 - PTO\_n + PTO\_0 <$ threshold_drift_behind $t\_n - t0 + PTO\_0 - PTO\_n <$ threshold_drift_behind Expected_PTO_$n$ − PTO_$n$ < threshold_drift_behind When the MPD_update_timer expires, then the monitoring entity 110 has not received an updated MPD in the expected timeframe, which indicates an LE deviation.

Example 2 (Note: Estimated Means Expected)

Initialisation:
Avst0=avst(MPD_0)
t0=injection time of MPD_0
PTO_0=PTO(MPD_0)
StartNumber0=startNumber(MPD_0)
start an optional MPD_update_timer with the expiration value duration+allowed_offset.
At every mpd update, the monitoring entity performs the following
now=current_time( )//injection time of MPD_n
Elapsed_time=now−t0 (alt 1)
Elaspsed_time=avst(mpd_n)−avst(mpd0) (alt 2)
restart the optional MPD_update_timer with the expiration value duration+allowed_offset.
estimatedIndex=elapsed_time/segment_duration[+StartNumber0]
CurrentIndex=(pto_tx−pto_0)/segment_duration[+StartNumber0]

If (estimatedIndex−currentIndex)<threshold_drift_behind
OR
If (estimatedIndex−currentIndex)>threshold_drift_ahead
Then LE deviation.

Again, when the MPD_update_timer expires, then the monitoring entity 110 has not received an updated MPD in the expected timeframe, which indicates an LE deviation.

Figure 4:
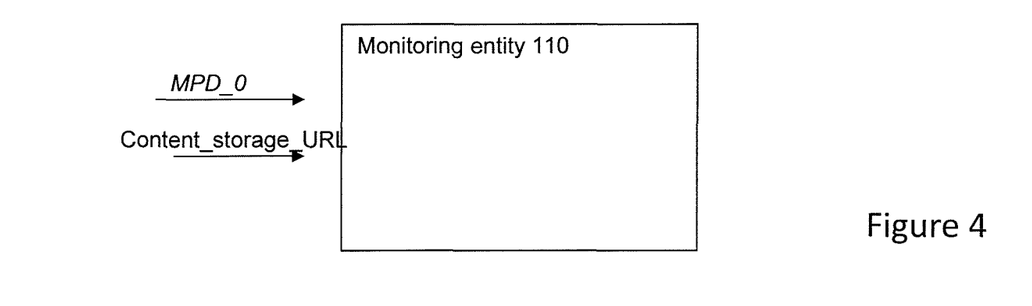
FIG. 4 is a block diagram illustrating a further embodiment of the monitoring entity of the system in FIG. 1.

Referring to FIG. 4, monitoring of the content storage 112 will be described. Contrary to the MPD storage case, the monitoring entity 110 relies on the segments being injected. The monitoring entity 110 monitored file system for file creation. Any new file with the pattern specified in the MPD is taken into account. The index of the segment is extracted from the name.

One embodiment for monitoring the content storage 112 can be summarized as follows:

MPD_0 is put into the MPD storage.

A media segment x is injected into the content storage at time instance t. From the URI of this media segment, the segment number x is determined.

The availability time of this media segment x is calculated using the availability start time of the MPD_0 and the extracted segment number x.

The presentation time of the segment can be determined from the earliest_presentation_time value, which is carried within the 'sidx' box of the segment or the mediaBaseDecodeTime value from the 'tfdt' box.

The actual detected availability time of the media segment x is compared with the calculated availability time of the media segment x.

The following algorithm (pseudocode example) may be used by the monitoring entity 110:

Intitialisation
Avst=avst(MPD_0)
startNumber=startNumber(MDP_0)
presentation time offset
start an optional Next_Segment timer with the expiration value duration+allowed_offset.
at every new segment ingestion, the monitoring entity performs the following:
now=current_time( )//injection time of segment n with current_index.
restart the optional NextSegment_timer with the expiration value duration+allowed_offset.
estimated_Index=(now−Avst)/duration+startNumber
if estimatedIndex!=current_index then LE deviation
Check the presentation time offset
When the Next_Segment_timer expires, then the monitoring entity 110 has not received the next segment within the expected timeframe, which constitutes an indication of an LE deviation.

It will be appreciated that the above algorithm can be also implemented by comparing a difference between the estimatedIndex and the current_index with a threshold, in order to detect a drift ahead or a drift behind of the LE.

Another embodiment for monitoring the content storage 112 can be summarized as follows:

MPD_0 is put into the MPD storage.

A media segment x is injected at time instance t into the content storage.

The presentation timestamp PTS is extracted from the sidx box or the tfdt box of media segment x. The presentation timestamp represents the time of the play out of the media stream (first frame of the segment).

The presentation time offset PTO is extracted from the MPD_0.

A duration between the time instance at which the segment is injected into the content storage (represented by PTS of segment x) and a time instance at which the MPD_0 becomes available (represented by PTO of MPD_0) is calculated by subtracting the PTO of MPD_0 from the PTS of the segment x.

The same duration is calculated using the PTO of the MPD_0, the availability start time of MPD_0 and the segment number x.

Both durations are compared, e.g., using thresholds such as threshold_drift_ahead or threshold_drift_behind This approach is more accurate compared to relying on information about one time instance t. It may be based on the following pseudocode example. PTS(seg_n) refers to the presentation time stamp of the newly received segment n:

Intitialisation
Avst=avst(MPD_0)
startNumber0=startNumber(MDP_0)
PTO_0=presentationTimeOffset(MPD_0)
start the Next_Segment timer with the expiration value duration+allowed_offset.
at every new segment ingestion, the monitoring entity performs the following:
estimated_Index=(PTS(seg_n)−PTO_0)/duration+startNumber0
if estimatedIndex−startNumber (updated_mpd)<threshold_drift_behind
OR
estimatedIndex−startNumber (updated_mpd)>threshold_drift_ahead then LE deviation
When the Next_Segment_timer expires, then the monitoring entity 110 has not received the next segment within the expected timeframe, which is indication of an LE deviation.

Another embodiment for monitoring the content storage 112 can be summarized as follows:

MPD_0 is put into the MPD storage.

The presentation time offset PTO is extracted from the MPD_0.

A media segment x is injected at time instance t into the content storage (which does not trigger the verification procedure here).

The verification procedure is executed with a fixed interval. The verification procedure finds the newest segment in the segment storage.

The verification procedure calculates either an expected segment index or an expected presentation timestamp or both.

The presentation timestamp PTS is extracted from the sidx box or the tfdt box of media segment x (latest in the storage). The presentation timestamp represents the time of the play out of the media stream (first frame of the segment).

The verification procedure compares the expected segment index with the segment index of the latest injected segment using thresholds. Alternatively, the verification procedure compares the presentation timestamp of the latest injected segment with the expected presentation timestamp using thresholds.

This approach is more robust, since the verification procedure is executed with a fixed interval. It may be based on the following pseudocode example. PTS(seg_n) refers to the presentation time stamp of the newly received segment n:

Intitialisation
Avst=avst(MPD_0)
startNumber0=startNumber(MDP_0)
PTO_0=presentationTimeOffset(MPD_0)

expectedNumber: is initialized with startNumber (MPD_0) and will be incremented by 1 every timeout expectedPTS: Is the PTO_0 at start and will be incremented by the segment duration (in sec or in timeoffset ticks)

startTime=currentTime or time of injection of first segment start the Next_Segment timer with the expiration value duration+allowed_offset.

at every next_segment_timer timeout, the monitoring entity performs the following:

find the newest segment (i.e. segment which was injected most recently)

if (abs(expectedPTS−PTS(seg_n))>threshold)

LE deviation detected

If (expectedNumber!=currentNumber)

LE deviation detected

A control of the MPD update will be described in the following. Whenever a deviation or a malfunction is detected by the monitoring entity 110, the monitoring entity 110 triggers that the eMBMS 104 is informed. In another embodiment, a further network entity responsible for updating the MPD and responsible for sending the updated MPD can be informed instead of the eMBMS 104.

In the case of the eMBMS 104 having modified the MPD, the eMBMS 104 will have to perform the update on the newly generated MDP.

The described mechanism may enable, inter alia, that an LE 102 index drift is detected. Such detection is necessary to correct the MPD and let the client play the content.

Figure 5:
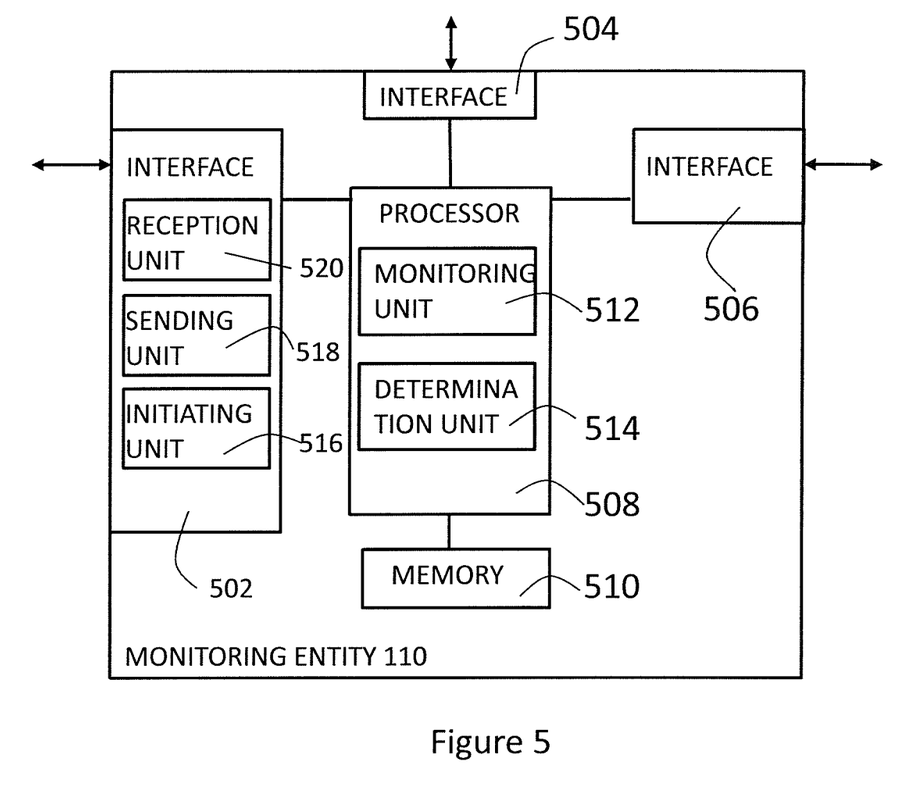
FIG. 5 is a block diagram illustrating a monitoring entity according to a still further embodiment.

Referring to FIG. 5, a monitoring entity 110 for initiating an update of a media manifest is described. The monitoring entity 110 comprises an interface 502, 504, 506 to the eMBMS 104, the BM-SC 106 and the CDN/HTTP server 108, respectively. The interfaces 502, 504, 506 are each coupled to a processor 508, which has access to a memory 510.

The monitoring entity 110 further comprises in one implementation a monitoring unit 512 adapted to monitor an availability time of a media segment compared to an expected availability time of the media segment, the expected availability time being described by an initial media manifest, a determination unit 514 adapted to determine whether a deviation of the monitored availability time of the media segment from the expected availability time of the media segment is present, and an initiating unit 516 adapted to initiate the update of the initial media manifest based on the determination.

In the above or a further implementation, the monitoring entity 110 is configured to detect an encoder functionality issue in the media distribution system 100, or a similar system, in which consecutive media segments are transmitted to a media client and in which media descriptions describe expected availability times of media segments for the media client.

In such an implementation, the monitoring unit 512 is adapted to monitor an availability time of a media segment compared to an expected availability time of the media segment, wherein the expected availability time is described by (e.g., in units of time or segments) or derived from (e.g., by interpolation) a media description. The determination unit 514 is adapted to determine whether a deviation of the monitored availability time of the media segment from the expected availability time of the media segment is present. As such, the monitoring entity 110 may be adapted to at least implicitly detect the encoder functionality issue based on a result of the determination. In addition, or as an alternative, the initiating unit 516 may be adapted to initiate update of the media description based on a result of the determination by determination unit 514 (e.g., in response to the detected encoder functionality issue).

In the embodiment of FIG. 5, the monitoring unit 512 and the determination unit 514 are realized in the processor 508 (e.g., in the form of software controlling the operation of the processor 508). The initiating unit 516, on the other hand, is realized in the interface 502, together with a sending unit 518 and a reception unit 520. The initiating unit 516 may be triggered by the processor 508 to initiate the update via the sending unit 518 (e.g., by informing the eMBMS 104 accordingly). The initiating unit 516 may be integrated in one or both of the sending unit 518 and the reception unit 520.

The monitoring entity 110 of FIG. 5 is adapted to perform a method according to the embodiments described above and below, and comprises respective functionality based units imbedded in respective physical units illustrated in FIG. 5.

Figure 6:
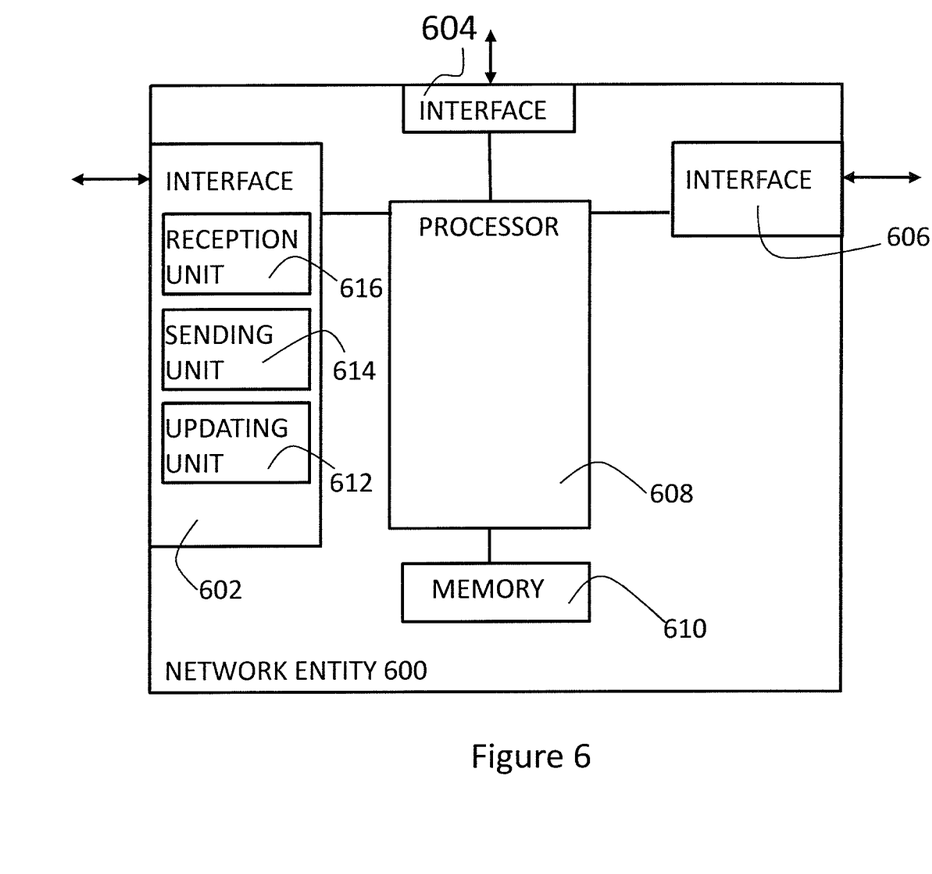
FIG. 6 is a block diagram illustrating a network entity according to an embodiment.

Referring to FIG. 6, a network entity 600 for updating a media manifest is described. The network entity 600 comprises an interface 602, 604, 606 to the BM-SC 106, the CDN/HTTP server 108 and the monitoring entity 110, respectively. The interfaces 602, 604, 606 are each coupled to a processor 608, which has access to a memory 610. The network entity 600 may be realized by the eMBMS 104 or otherwise.

According to a supplemental or alternative implementation, the network entity 600 is configured to correct an encoder functionality issue in the media distribution system 100 of FIG. 1, or a similar system, in which consecutive media segments are transmitted to a media client and in which media descriptions describe expected availability times of media segments for the media client.

In such an implementation, the updating unit 612, or another unit of a network entity 600, is adapted to correct the encoder functionality issue in response to a deviation of a monitored availability time of a media segment for an expected availability time of the media segment. The expected availability time may be described by, or derived from, a media description. In case the unit adapted to correct the encoder functionality issue is implemented by the updating unit 612, correcting the encoder functionality issue may comprise updating the media description. As such, the network entity 600 may be configured to update the media description.

As stated above, in one implementation, the network unit 600 is realized in or by the eMBMS 104. In another implementation, the network unit 600 is realized by a network entity different from the eMBMS 104.

The network entity 600 comprises an updating unit 612 adapted to update the initial media manifest based on a result of determining whether a deviation of the monitored availability time of the media segment from the expected availability time of the media segment is present. The updating unit 612 may be part of a reception unit 616 and/or a sending unit 614 realized in the interface 602.

The network entity 600 is adapted to perform a method according to the embodiments described above and below, and comprises respective functionality based units imbedded in respective physical units illustrated in FIG. 6.

It is noted that an association between the physical units of the monitoring entity 110 and the network entity 600 illustrated in FIGS. 5 to 6, respectively, and the functionality based units of the monitoring entity 110 and the network entity 600 illustrated these drawings, respectively, may differ from the described embodiments. For example, the initiating unit 516 of the monitoring entity 110 illustrated in FIG. 5 may be part of the interface 502, the processor 508, and the memory 510 of the monitoring entity 110.

In the following, various further embodiments of the present disclosure will be described.

1. A method embodiment for initiating an update of a media manifest, the method comprising:
   monitoring an availability time of a media segment compared to an expected availability time of the media segment, the expected availability time being described by or derived from an initial media manifest,
   determining whether a deviation of the monitored availability time of the media segment from the expected availability time of the media segment is present, and
   initiating the update of the initial media manifest based on a result of the step of determining (e.g., either the index drift or the presentation timeline drift).

In particular, the initial media manifest may comprise or may be embodied as initial media description, particularly an initial or first MPD. With reference to FIGS. 1 to 4, the initial MPD may be referred to as MPD_0.

The determining step may comprise determining whether a deviation of monitored presentation timestamps from expected presentation timestamps is present. Additionally or alternatively, the determining step may be based on media segment indices.

2. The method according to embodiment 1, wherein the step of monitoring comprises monitoring a reception time of media segments, wherein the step of determining comprises determining a deviation of the monitored reception time of the media segments from the expected reception time of the media segments.

In particular, the reception time may correspond to the availability time.

3. The method according to embodiment 2, wherein a mapping between a unique media segment identifier and the expected availability time is derivable from the initial media manifest, wherein the step of monitoring is based on the initial media manifest.

In particular, the method further may comprise the step of receiving the initial media manifest particularly prior to a generation of the media segments.

In particular, the unique media identifier may comprise an index of the media segment.

In particular, the method may further comprise receiving information indicating a location of a storage of the received media segments. In particular, the information may be a Uniform Resource Locator of the storage, particularly a content storage.

4. The method according to any one of embodiments 1 to 3, wherein the step of monitoring comprises monitoring an expected availability time of a certain media segment derived from the initial media manifest and an expected availability time of the certain media segment derived from an updated media manifest, wherein the step of determining comprises determining a deviation of the expected availability time of the certain media segment derived from the initial media manifest and the expected availability time of the certain media segment derived from the updated media manifest.

5. The method according to embodiment 4, wherein the step of determining comprises comparing the determined deviation with at least one threshold, wherein the step of initiating is performed if the determined deviation is above or below the at least one threshold.

In particular the at least one threshold may correspond to zero or a value different from zero. In particular, the at least one threshold may comprise a positive value or a negative value.

For example, the threshold may correspond to zero. In such a case a mismatch between the expected availability time of the certain media segment derived from the initial media manifest and the expected availability time of the certain media segment derived from the updated media manifest is determined.

For example, first and second thresholds may be used for the determination. The first threshold may correspond to a positive value and the second threshold may correspond to a negative value. The update of the initial media manifest is initiated if the deviation is above the first threshold and/or if the deviation is below the second threshold.

6. The method according to any one of embodiments 1 to 5, wherein the step of initiating comprises sending, to a network entity, a notification for updating the initial media manifest.

The network entity may be responsible for updating the initial media manifest, and/or sending the initial media manifest and/or updated media manifest to one or more clients. For example, the network entity may be embodied as an eMBMS node. In particular, a BM-SC may comprise the eMBMS functionality.

In particular, the network entity may receive the updated media manifest from a media manifest generation entity, particularly a live encoder, and may optionally modify the received updated media manifest. In particular, the media update generation unit may also generate the media segments.

7. The method according to any one of embodiments 1 to 6, wherein the step of initiating comprises updating the initial media manifest by adapting an availability start time and/or an initial segment number of the initial media manifest based on the determined deviation.

In particular, the initial segment number may correspond to the startNumber field of a MPD.

8. The method according to any one of embodiments 1 to 7, the method being performed by a monitoring entity.

In particular, the monitoring entity may be co-located with a BM-SC node or an eMBMS node.

9. A method embodiment for updating a media manifest, the method comprising:
   updating the initial media manifest based on a result of determining whether a deviation of the monitored availability time of the media segment from the expected availability time of the media segment is present.

In particular, the determination is based on monitoring an availability time of a media segment compared to an expected availability time of the media segment, the expected availability time being described by an initial media manifest.

In particular, the method may be performed by a network entity, particularly an eMBMS node.

10. A monitoring entity embodiment for initiating an update of a media manifest, the monitoring entity comprising:
   an monitoring unit adapted to monitor an availability time of a media segment compared to an expected availability time of the media segment, the expected availability time being described by an initial media manifest,
   a determination unit adapted to determine whether a deviation of the monitored availability time of the media segment from the expected availability time of the media segment is present, and
an initiating unit adapted to initiate the update of the initial media manifest based on the determination.

11. A network entity embodiment for updating a media manifest, the network entity comprising:
an updating unit adapted to update the initial media manifest based on a result of determining whether a deviation of the monitored availability time of the media segment from the expected availability time of the media segment is present.

12. A system embodiment for updating a media manifest, the system comprising a monitoring entity according to embodiment 10 and a network entity according to embodiment 11.

13. A computer program, which, when being executed by a processor, is adapted to carry out or control a method for initiating an update of a media manifest according to any one of embodiments 1 to 8 or a method for updating a media manifest according to the embodiment 9.

In particular, the embodiments described for the method performed by the monitoring unit, the method performed by the network entity, the monitoring entity and the network entity, respectively, apply to the embodiments described for the respective other methods and entities.

Modifications and other embodiments of the disclosed embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a media distribution system in which consecutive media segments generated by an encoder are broadcast and in which media descriptions describe expected availability times of media segments for media clients receiving the broadcast, the method comprising:
determining an expected availability time of a media segment based on an initial media description;
monitoring a storage unit for storing content generated by the encoder, wherein the storage unit is remote from the media clients and the content is i) updated media descriptions generated by the encoder and describing expected availability times of media segments generated by the encoder and/or ii) the media segments generated by the encoder;
based on the monitoring of the storage unit that is remote from the media clients, determining that an updated media description has not been stored in the storage unit by the expected availability time and/or determining that the media segment has not been stored in the storage unit by the expected availability time; and
detecting an issue with the functionality of the encoder that generates the media segments as a result of determining that the updated media description has not been stored in the storage unit by the expected availability time or determining that the media segment has not been stored in the storage unit by the expected availability time, wherein
the detecting is performed by a monitoring entity located on a system-side to which the media clients can connect.

2. The method of claim 1, wherein the expected availability time is described by or derived from an initial media description.

3. The method of claim 2, wherein the initial media description is a media description distributed over a service discovery channel before the beginning of media segment transmission or a media description sent before media segment generation.

4. The method of claim 2, wherein the initial media description is provided for being fetched via unicast before the beginning of media segment transmission.

5. The method of claim 1, wherein the media segments have respective media presentation times, and wherein the expected availability time is determined on a media presentation time basis.

6. The method of claim 1, wherein
the media segments have respective media presentation times carried in the media segments, and
determining that an updated media description has not been stored in the storage unit by the expected availability time or determining that the media segment has not been stored in the storage unit by the expected availability time comprises comparing a media presentation time of a latest available segment with an expected media presentation time derived from the media description.

7. The method of claim 1, wherein
determining the expected availability time of a media segment comprises determining an index for the media segment, and
determining that an updated media description has not been stored in the storage unit by the expected availability time or determining that the media segment has not been stored in the storage unit by the expected availability time comprises determining whether a difference between a detected index and the index for the media segment exceeds a threshold.

8. The method of claim 1, wherein the media data segments have respective indices, and further comprising determining the expected availability time from a sum of an availability start time and a product of a segment index and a segment duration.

9. The method of claim 1, wherein the media data segments have respective indices, and further comprising determining the expected availability time by interpolating an availability start time, a segment index and a presentation time offset.

10. The method of claim 1, wherein
the method comprises determining that an updated media description has not been stored in the storage unit by the expected availability time, and
determining that the updated media description has not been stored in the storage unit by the expected availability time comprises detecting the expiration of a timer.

11. The method of claim 1, wherein
the method comprises determining that the media segment has not been stored in the storage unit by the expected availability time, and
determining that the media segment has not been stored in the storage unit by the expected availability time comprises detecting the expiration of a timer.

12. The method of claim 11, wherein the timer is set according to a media segment duration.

13. The method of claim 1, wherein the media segments are transmitted via broadcast.

14. The method of claim 1, wherein the media description is a media manifest.

15. The method of claim 14, wherein the media manifest is compliant with Dynamic Adaptive Streaming over HTTP.

16. The method of claim 1, wherein detecting an issue with the functionality of the encoder comprises one of: i) detecting a restart of the encoder and ii) detecting that the encoder has malfunctioned.

17. The method of claim 1, wherein the monitoring entity is co-located on the system-side with a Broadcast Multicast Service Center (BM-SC) or a Hypertext Transfer Protocol (HTTP) server.

18. The method of claim 1, further comprising:
generating an updated media description as a result of the detection of the encoder functionality issue; and
performing at least one of the following steps after generating the updated media description:
transmitting the updated media description in-band with a media data segment broadcast;
transmitting the updated media description on a service discovery channel (SDCH); and
storing the updated media description in a media description storage accessible to a Hypertext Transfer Protocol (HTTP) server adapted to transmit to a remote media client a copy of the updated media description in response to receiving from the remote media client a request for the updated media description.

19. The method of claim 18, further comprising:
prior to generating the updated media description, receiving a trigger message from the monitoring entity, wherein the step of generating the updated media description is performed as a result of receiving the trigger message.

20. The method of claim 1, wherein
the method further comprises initiating an update of a media description in response to the detected encoder functionality issue, and
the initiation of the update comprises sending a notification to a Multimedia Broadcast and Multicast Services (MBMS) gateway responsible for updating the media description.

21. The method of claim 1, wherein the media segments have respective indices, and further comprising initiating a change of the segment indices of media segments generated by the encoder in response to the detected encoder functionality issue.

22. The method of claim 21, wherein the segment indices are contained in media segment names assigned by the encoder, and further comprising changing the segments indices by changing the media segment names assigned by the encoder.

23. The method of claim 21, wherein the segment indices are contained in media segment names assigned by the encoder, and wherein initiating the change of the segment indices comprises triggering the encoder to change an assignment scheme for the media segment naming.

24. The method of claim 1, wherein the media segments have respective presentation times carried in the media segments, and further comprising initiating a change of the presentation times of media segments generated by the encoder in response to the detected encoder functionality issue.

25. The method of claim 18, wherein at least two of the following steps are performed after generating the updated media description:
transmitting the updated media description in-band with a media data segment broadcast;
transmitting the updated media description on a service discovery channel (SDCH); and
storing the updated media description in a media description storage accessible to a Hypertext Transfer Protocol (HTTP) server adapted to transmit to a remote media client a copy of the updated media description in response to receiving from the remote media client a request for the updated media description.

26. A method of correcting an encoder functionality issue in a media distribution system in which consecutive media segments generated by the encoder are transmitted to a media client and in which media descriptions describe expected availability times of media segments for the media client, the method comprising:
correcting the encoder functionality issue in response to a deviation of a monitored availability time of a media segment from an expected availability time of the media segment, wherein the expected availability time is described by or derived from a media description, and correcting the encoder functionality issue comprises updating the media description, thereby generating an updated media description;
performing at least one of the following steps as a result of generating the updated media description:
1) sending the updated media description in-band with a media data segment broadcast;
2) sending the updated media description on a service discovery channel, and
3) storing the updated media description in a media description storage for fetching over unicast; and
receiving a notification transmitted by a monitoring entity, the notification indicating that the monitoring entity has detected the deviation, wherein
the step of correcting the encoder functionality issue is performed in response to receipt of the notification transmitted by the monitoring entity.

27. The method of claim 26, wherein updating the media description comprises adapting at least one of an availability start time and a segment number in the media description based on the deviation.

28. A computer program product comprising a non-transitory computer readable medium comprising program-code portions for carrying out the steps of claim 1 when run by a computing device.

29. A monitoring entity in a media distribution system in which consecutive media segments generated by the encoder are transmitted to a media client and in which media descriptions describe expected availability times of media segments for the media client, the monitoring entity comprising:
a memory; and
processing circuitry coupled to the memory, wherein the monitoring entity is configured to:
determine an expected availability time of a media segment based on an initial media description;
monitor a storage unit for storing content generated by the encoder, wherein the storage unit is remote from the media clients and the content is i) updated media descriptions generated by the encoder and describing expected availability times of media segments generated by the encoder and/or ii) the media segments generated by the encoder;
based on the monitoring, determine that an updated media description has not been stored in the storage unit by the expected availability time and/or determining that the media segment has not been stored in the storage unit by the expected availability time; and detecting an issue with the functionality of the encoder that generates the media segments as a result of determining that the updated media description has not been stored in the storage unit by the expected availability time or determining that the media segment has not been stored in the storage unit by the expected availability time, wherein
the monitoring entity is located on a system-side to which the media clients can connect.

30. The monitoring entity of claim 29, wherein the monitoring entity is further configured to update the initial media description in response to detecting the encoder functionality issue.

31. A network entity for correcting an encoder functionality issue in a media distribution system in which consecutive media segments generated by the encoder are transmitted to a media client and in which media descriptions describe expected availability times of media segments for the media client, the network entity comprising:
a memory; and
processing circuitry coupled to the memory, wherein the network entity is configured to:
correct the encoder functionality issue in response to receiving a notification transmitted by a monitoring entity, the notification indicating that the monitoring entity has detected a deviation of a monitored availability time of a media segment from an expected availability time of the media segment, wherein the expected availability time is described by or derived from a media description, and correcting the encoder functionality issue comprises updating the media description, thereby generating an updated media description; and
perform at least one of the following steps as a result of generating the updated media description:
1) sending the updated media description in-band with a media data segment broadcast;
2) sending the updated media description on a service discovery channel, and
3) storing the updated media description in a media description storage for fetching over unicast.

32. A system for correcting an encoder functionality issue comprising:
the monitoring entity of claim 29; and
a network entity configured to:
update a media description in response to receiving a notification transmitted by the monitoring entity, thereby generating an updated media description; and
perform at least one of the following steps as a result of generating the updated media description:
1) sending the generated updated media description in-band with a media data segment broadcast;
2) sending the generated updated media description on a service discovery channel, and
3) storing the generated updated media description in a media description storage for fetching over unicast.

* * * * *